April 19, 1927.

W. J. LOUDENSLAGER 1,625,036

DOUGH RAISER

Original Filed Aug. 31, 1925  2 Sheets-Sheet 2

Inventor:
Wm J. Loudenslager,
By Monroe E. Miller
Attorney.

Patented Apr. 19, 1927.

1,625,036

UNITED STATES PATENT OFFICE.

WILLIAM J. LOUDENSLAGER, OF NEW MARTINSVILLE, WEST VIRGINIA.

DOUGH RAISER.

Application filed August 31, 1925, Serial No. 53,708. Renewed September 13, 1926.

The present invention relates to a device for raising dough in the making of bread, and aims to provide a dough raiser that will be practical and efficient in use.

Another object is the provision of such a device having a dough chamber and means for supplying heat, air and moisture to said chamber and for distributing the moisture and heated air in order that the dough will be uniformly heated.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
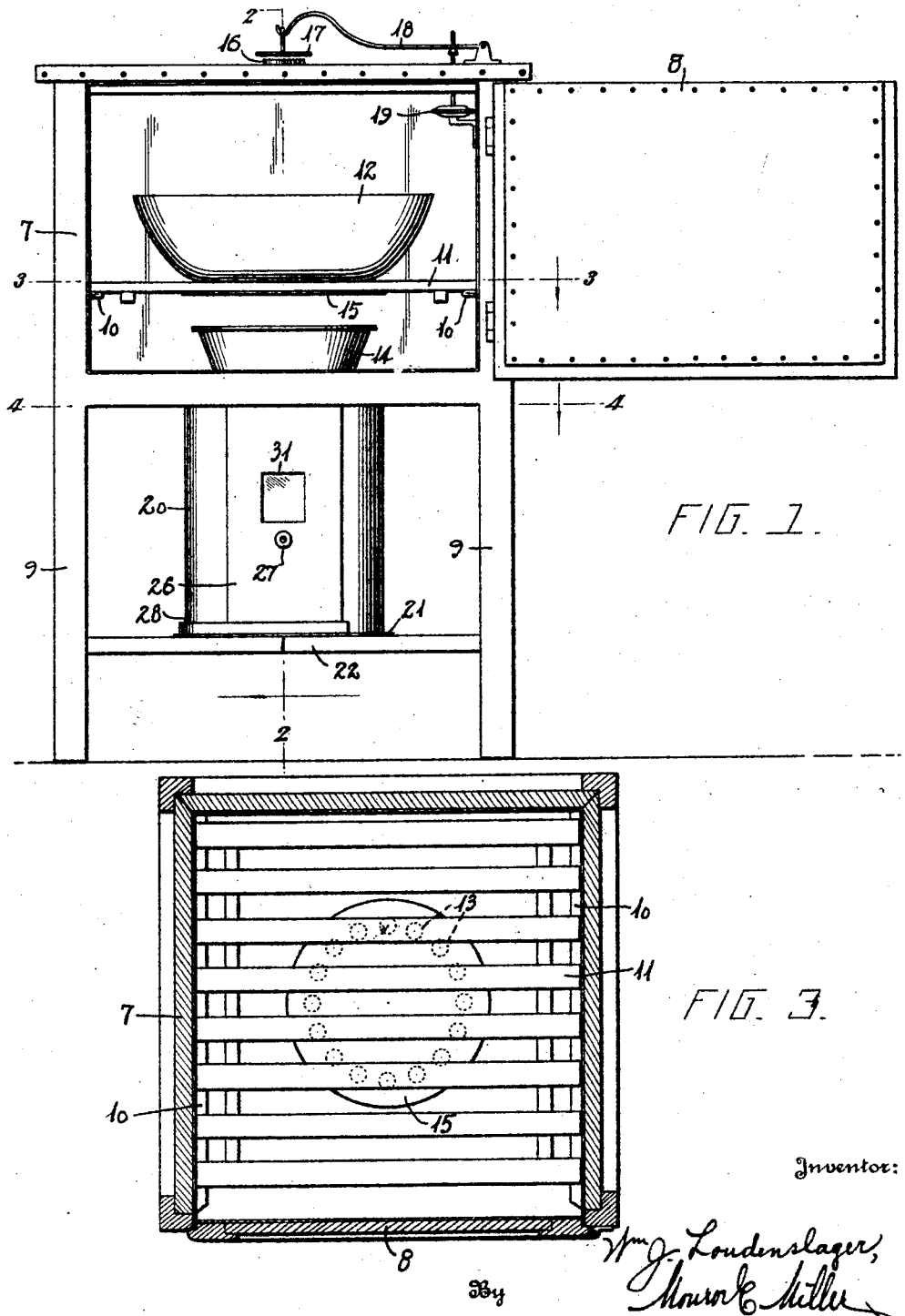
Figure 1 is a front view of the dough raiser, with the door of the dough chamber swung open.
Figure 2:
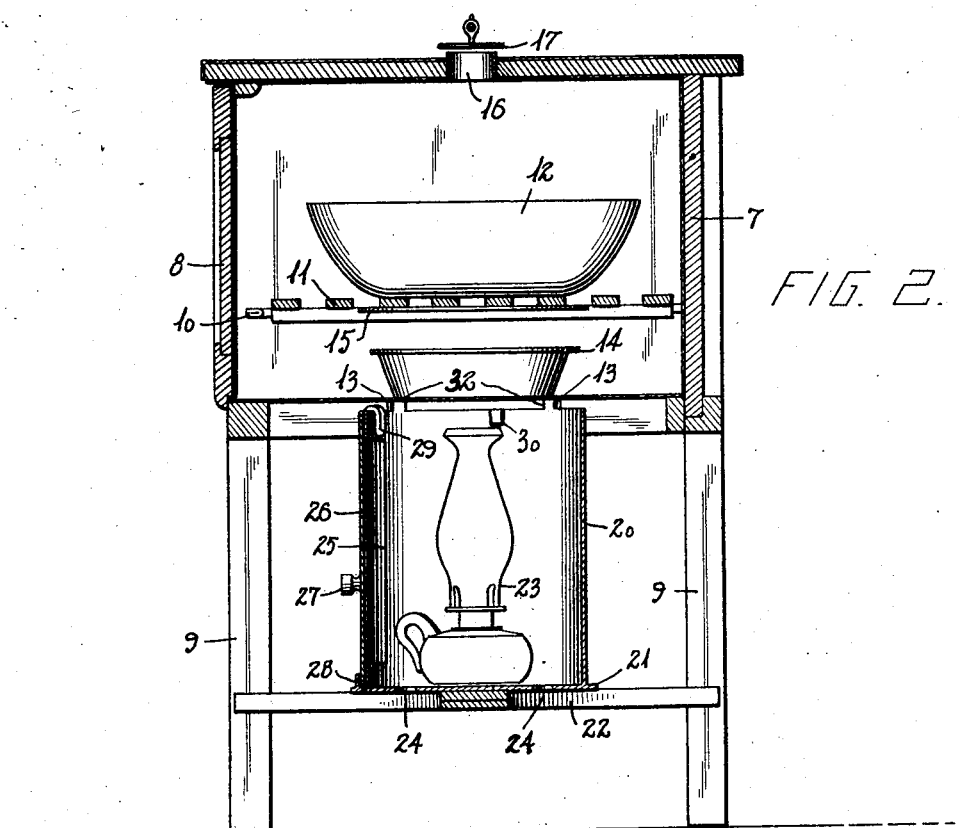
Fig. 2 is a vertical section on the line 2—2 of Fig. 1, with the door closed, and portions shown in elevation.
Figure 4:
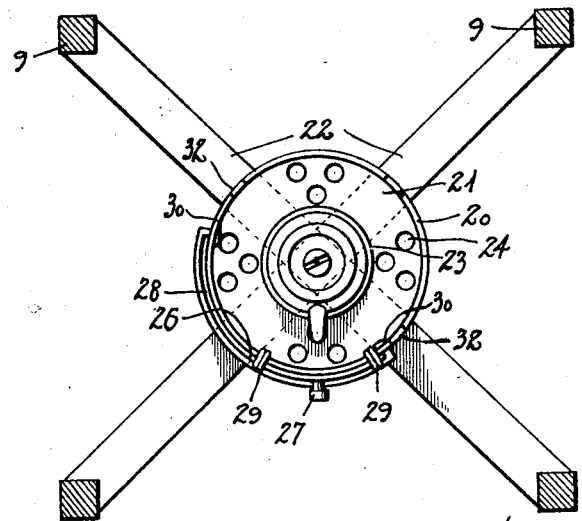

Figs. 3 and 4 are horizontal sections on the respective lines 3—3 and 4—4 of Fig. 1.

In carrying out the invention there is provided a cabinet constructed of wood or other suitable material and comprising the dough chamber 7 having the door 8 which may be swung open for access to said chamber, and the chamber is mounted on the legs 9. The bottom of the chamber 7 is preferably of sheet metal and the walls, door 8 and top of the chamber are also preferably lined with sheet metal. Opposite side walls of the chamber 7 have cleats or flanges 10 spaced above the bottom of the chamber for supporting a shelf 11, preferably composed of wooden slats spaced apart to permit air to pass upwardly through the shelf between the slats. The shelf 11 supports the pan, bowl or other receptacle 12 containing the dough with said receptacle spaced above the bottom and below the top of the chamber 7, as well as being spaced from the walls and door of said chamber.

The bottom of the chamber has an annular group of apertures 13 for receiving air from below the chamber, and a pan or receptacle 14 containing water is seated on the bottom of the chamber within the area surrounded by the apertures 13. A spreader plate 15 is secured to the bottom of the shelf 15 above the pan 14, so as to be located below the dough receptacle 12. The plate 15 may be insulated or of insulating material, so as to prevent the excessive heating of the bottom of the receptacle 12, and said plate serves to spread the air and water vapor radially in all directions from below said plate to the sides of the chamber 7.

In order to control the temperature within the chamber, the top of the chamber has a vent opening 16 controlled by a damper 17 carried by a lever 18 mounted on the top of the chamber, and a suitable thermostat 19 is disposed within the chamber and connected to the lever 18 for controlling the damper 17, said damper 17 closing the opening 16 when the temperature drops below a predetermined amount within the chamber, and the damper 17 is opened when the temperature is increased above the predetermined amount for which the thermostat is adjusted.

The heater is located below the chamber 7 within a cylindrical housing or casing 20 having a bottom 21 mounted on diagonal cross bars 22 secured to the legs 9. An oil lamp 23 or other hydrocarbon burner may be located within the housing 20, and is protected thereby from drafts and winds. The upper end of the housing 20 is open and is spaced slightly below the bottom of the chamber 7, to provide an annular space or slot between the housing and bottom of the chamber for the passage of air over the housing or casing 20 under the bottom of the chamber. The apertures 13 are located above the housing 20 and are spaced inwardly from the wall of said housing. The bottom 21 of the housing 20 has air inlet apertures 24 to supply air for the lamp 23. Said housing 20 has an opening 24 at one side normally closed by a curved door 26 that is movable partly around the housing, said door having a knob or handle 27 for conveniently sliding the door. The lower end of the door 26 is movable in a slotted guide 28 on the bottom 21 at the exterior of the housing 20, and hooks 29 are secured to the upper end of said door and engage over the upper end of the housing 20. The ends of the guide 28 limit the movement of the lower end of the door 26, while stops 30 are carried by the housing 20 for the contact of the hooks 29 to limit the movement of the upper end of the door. The door 26 has a transparent panel or window 31 in order that the lamp 23 may be observed without opening the door 26. Said door 26 may be opened for access to the lamp 23, and the door may also be opened to regulate the draft. The housing 20 has lugs 32 at its upper end supporting the bottom of the chamber 7.

In operation, when the pan or receptacle 12 containing the dough is placed in the chamber 7 on the shelf or rack 11, the door 8 is closed, and the lamp 23 is lighted and the flame adjusted. Products of combustion and heated air rise within the housing 20 and pass upwardly through the apertures 13 into the chamber 7. Surplus heated air or products of combustion from the housing 20 may pass over the upper end of the housing 20 below the bottom of the chamber 7, and fresh air may also pass inwardly over the upper end of the housing 20 to mix with the heated air and pass upwardly through the apertures 13. This provides for a mixture of fresh air with the heated air and products of combustion in order to obtain the best results. The air which passes upwardly through the apertures 13 is spread by the pan or receptacle 14 and plate 15 so as to pass upwardly on all sides of the receptacle 12. The pan or receptacle 14 is also heated, being placed on the bottom of the chamber 7 directly over the lamp 23, so that the water contained in the pan 14 will be evaporated, thereby supplying moisture or water vapor that will aid in the action of the yeast in the dough. The distribution of the air in the chamber 7 will result in the dough being heated uniformly and with a desired temperature, in order that the most advantageous action of the yeast in the dough may be obtained. The damper 17 being controlled by the thermostat 19 will maintain a predetermined temperature in the chamber 7.

With the present device the dough can be made to rise with uniformity, thereby greatly facilitating the making of bread and other baked goods.

Having thus described the invention, what is claimed as new is:—

1. A dough raiser comprising a dough chamber having an upper outlet, a shelf in the chamber for supporting a dough receptacle, a water receptacle on the bottom of the chamber below said shelf, said bottom of the chamber having apertures surrounding said water receptacle, a heater below the bottom of said chamber and said water receptacle, and a housing surrounding said heater having an air inlet at its lower end below the heater, the upper end of said housing being disposed adjacent to but spaced slightly from the bottom of the chamber at a point slightly outwardly beyond said apertures.

2. A dough raiser comprising a dough chamber having an upper outlet and a sheet metal bottom, a shelf in said chamber for supporting a dough receptacle, a water receptacle seated on the bottom of said chamber below said shelf, said bottom having apertures surrounding said water receptacle, a housing supported below said chamber and having inlet apertures in the bottom thereof, the upper end of said housing being disposed adjacent to but spaced slightly from the bottom of the chamber at a point slightly outwardly beyond said apertures, the upper end of said housing having portions supporting the bottom of the chamber, and an oil lamp seated in said housing below said water receptacle.

In testimony whereof I hereunto affix my signature.

WILLIAM J. LOUDENSLAGER.